United States Patent [19]

Leinfelder

[11] Patent Number: 4,695,021
[45] Date of Patent: Sep. 22, 1987

[54] SUPPORT STAND WITH ADJUSTABLE LEGS

[75] Inventor: Klaus Leinfelder, Oberasbach, Fed. Rep. of Germany

[73] Assignee: Cullmann Handelsgesellschaft für Verbrauchsgütter mbH, Langenzenn-Laubendorf, France

[21] Appl. No.: 782,426

[22] Filed: Sep. 30, 1985

[51] Int. Cl.⁴ ............................................. B64G 1/36
[52] U.S. Cl. .................................. 248/168; 248/163.1; 248/412; 403/109; 403/377
[58] Field of Search .................. 248/163.1, 163.2, 167, 248/188.5, 231.3, 412, 168; 403/83, 109, 104, 106, 377, 376; 160/135

[56] References Cited

U.S. PATENT DOCUMENTS

| | | | |
|---|---|---|---|
| 889,768 | 6/1908 | De Leeuw | 403/83 |
| 1,677,358 | 7/1928 | McKillop | 403/83 |
| 2,275,330 | 3/1942 | Fyeten | 403/104 |
| 2,490,369 | 12/1949 | Neuwirth | 248/188.5 |
| 2,508,039 | 5/1950 | Neuwirth | 248/188.5 |
| 2,591,051 | 4/1952 | Caldwell | 248/188.5 |
| 3,735,794 | 5/1973 | Lebowitz | 160/135 |
| 4,134,703 | 1/1979 | Hinners | 248/188.5 |
| 4,167,352 | 9/1979 | Pletscher | 403/104 |

FOREIGN PATENT DOCUMENTS

| | | | |
|---|---|---|---|
| 227920 | 10/1910 | Fed. Rep. of Germany | 248/188.5 |
| 592023 | 1/1934 | Fed. Rep. of Germany | 248/188.5 |
| 3430738 | 3/1986 | Fed. Rep. of Germany | 248/412 |
| 2519112 | 7/1983 | France | 248/188.5 |
| 565765 | 11/1944 | United Kingdom | 248/188.5 |
| 636294 | 4/1950 | United Kingdom | 248/188.5 |
| 707839 | 4/1954 | United Kingdom | 248/188.5 |
| 2035068 | 6/1980 | United Kingdom | 248/168 |

Primary Examiner—Cornelius J. Husar
Assistant Examiner—Anthony Knight

[57] ABSTRACT

A support stand for a camera or other optical device comprises a head portion supported by support legs comprising first and second telescopically related tube portions, the inner tube portion forming the upper part of the respective leg and the outer tube portion forming the lower part. A fixing device for locking the tube portions of each leg relative to each other comprises an actuating rod which extends within the tube portions and which carries at its lower end first and second clamping cone members which taper in the same direction and which are co-operable with respective pressure elements surrounding same. In a condition of the fixing means which is intermediate between the full locking condition thereof and the fully released condition thereof, a frictional lock is provided between the two telescopically related tube portions, such lock being such that it can be overcome by hand but prevents excessively easy axial displacement of the telescopic tube portions of the respective leg relative to each other, by virtue of each cone member urging the associated pressure element into frictional contact with the inside wall surface of the outer tube portion.

7 Claims, 2 Drawing Figures

SUPPORT STAND WITH ADJUSTABLE LEGS

This application is related to co-assigned co-pending U.S. patent application Ser. No. 782,425, filed simultaneously herewith; and the disclosure of said related application is hereby incorporated into this application by reference.

BACKGROUND OF THE INVENTION

The present invention relates generally to a support stand or tripod for an item of equipment that requires a stable and steady support, for example optical equipment such as a photographic, film or video camera or the like.

One known form of such a support stand comprises a head portion to which the device to be supported on the stand is mounted, and support legs which extend downwardly away from the head portion of the support stand. The support legs are formed by tube portions in telescopic relationship, that is to say, each support leg comprises at least first and second tube portions of which one is telescopically movably disposed within the other. The telescopically related tube portions of each leg can be readily locked in any position relative to each other, by means of a suitable fixing device. The fixing device may be of such a nature that it comprises a clamping cone member which is operable from outside the leg of the support stand, and a pressure element which co-operates with the cone member and which can be expanded thereby to brace against the outside telescopic tube portion. However, when the fixing device is not in the leg-locking position, the tube portions tend to collapse downwardly due to the force of gravity acting thereon. As a result of that, an item of equipment which is to be set at a given level, for example a camera or the like, by means of the support stand, must be firmly held at the required height, while the fixing device is in the unlocked condition so that the telescopic tube portions can move easily with respect to each other, so that the fixing device can then be actuated to lock the tube portions relative to each other, thereby to fix the respective legs at the appropriate lengths. It will be appreciated that it is often difficult to hold the camera or other item of equipment at the appropriate height, while the legs are being allowed to take up the appropriate positions in respect of length, and that means that it is frequently very difficult to set the item of equipment precisely at the desired position.

Furthermore, in the case of support stands or tripods in which the fixing device comprises a pressure element operable by means of a clamping cone member which can be actuated from outside the telescopic tube portions of the respective legs, thereby to clamp against the inside of the telescopic tube portion, the fixing device suffers from the disadvantage that the region in which the design of the stand provides for guidance for the telescopic tube portions in the axial direction is very short when the tube portions are in the condition of maximum extension, that is to say, when the legs are set to give their maximum lengths. That means that, most particularly when the tube portions are at their positions of maximum extension, the two tube portions of each leg may be relatively easily inclined relative to each other and thereby buckled, even when the tube portions are in the fixed and locked condition by virtue of the fixing device having been actuated. Quite apart from the danger of the legs being damaged in that way, the fact that the telescopically related tube portions of each leg can become inclined relative to each other due to the short length of the guide means for guiding the tube portions relative to each other means that the stability of the stand is often inadequate.

SUMMARY OF THE INVENTION

An object of the present invention is to provide a support stand or tripod for a camera or other optical device, which does not suffer from disadvantages of the above-discussed stands.

Another object of the present invention is to provide a support stand for a piece of optical equipment wherein the tube portions making up each telescopic leg cannot unintentionally move relative to each other as a result of the force of gravity when the fixing device is in an unlocked condition.

A further object of the present invention is to provide a support stand for an item of equipment such as a camera, which enjoys enhanced stability in respect of each support leg, even in the condition of being extended to its maximum.

Still another object of the present invention is to provide a support stand for a camera or like device comprising legs formed by telescopically related tube portions, wherein the tube portions of each leg are reliably guided relative to each other, even in the condition of maximum leg extension.

In accordance with the principles of the present invention, these and other objects are achieved by a support stand for an item of equipment, for example an optical device such as a photographic, film or video camera, comprising a head portion for mounting the item of equipment, and support legs connected to the head portion and extending downwardly therefrom in the operative position of the support stand. Each support leg comprises first and second tube portions which are in telescopic relationship with each other whereby one is displaceable within the other, while the tube portions can be secured relative to each other by means of a suitable fixing device. The fixing device comprises an actuating means such as a rod which is disposed within the telescopically related tube portions and which is displaceable in the axial direction thereof. At an end portion of the rod which is at the lower end in the operative position of the support stand, the rod carries two clamping cone or taper members which both taper in the same direction, while each cone member is surrounded by a co-operating pressure element. Each pressure element is mounted immovably in the axial direction by a co-operating holding member disposed at the end portion of the inner of the two telescopically related tube portions, that is the lower end thereof in the operative position of the stand. Each cone member bears against the inside wall surface of the outer one of the two telescopically related tube portions. Disposed between the actuating rod and a said holding member for a pressure element is a resilient spring member, the arrangement being such that in a normal operating condition of the fixing device in which the fixing device is neither in a locked position to prevent movement of the telescopically related tube portions nor in a release position in which the tube portions are very easily movable relative to each other, the two cone members urge the respective pressure elements against the inside wall surface of the outer tube portion with such a force as to provide a frictional connection between the two tube portions, which can be overcome by hand.

As will be readily apparent from the description of a preferred embodiment hereinafter, the arrangement of the actuating rod, in accordance with the teaching of the present invention, provides the particular advantage that the actuating member which is connected to the actuating rod, for actuation of the fixing device between its locked and released positions, can be disposed in the vicinity of the head portion of the stand on which the item of equipment supported thereby is mounted so that the fixing device for each leg of the support stand is always disposed in the vicinity of the support head portion, in any position of the support stand, that is to say, irrespective of the length of each support leg, and the fixing device can thus be actuated by manipulation in the vicinity of the support head portion. This is in contrast with known support stands in which the actuating member for the fixing device is located at the region of the transition between the two telescopically related tube portions of the respective leg, which means that it is generally necessary to bend down in order to manipulate the actuating member of the fixing device, particularly when the support stand is set at a low level of support. Furthermore, the fact that the arrangement in accordance with the invention has two clamping cone members and two pressure elements co-operating therewith, which are mounted immovably in the axial direction by means of the two holding members in the lower end portion of the inner one of the two telescopically related tube portions means that the stand according to the invention achieves the particular advantage that the two telescopic tube portions, even in the completely extended and locked condition thereof, are supported and guided over a substantial length which is afforded by virtue of the spacing between the two pressure elements, thereby substantially eliminating the possibility of bending or buckling as between the two telescopically related tube portions, in any position of the respective support leg, that is to say, irrespective of the set length thereof. That therefore affords excellent stability for the stand according to the invention, at all times.

By virtue of the fact that, in the normal operative condition, that is to say, in a condition in which the fixing device is neither in the locked position in which the telescopically related tube portions are prevented from axial movement relative to each other nor in the unlocked condition in which the telescopically related tube portions can move easily relative to each other of their own accord as a result of the force of gravity acting thereon, the pressure elements co-operating with the two cone members are urged against the inside wall surface of the outer one of the telescopically related tube portions by a force such that there is a frictional connection which can be overcome by hand between the two telescopically related tube portions, the arrangement in accordance with the invention achieves the advantage that the telescopic tube portions can be very accurately adjusted and set relative to each other, in order to set each support leg at the desired overall length.

In a preferred feature of the invention, the two cone members which are secured to the actuating rod may be at such a spacing from each other that the two pressure elements which are disposed around the respective cone members enclose between them the first holding member which is secured to the lowermost end, in the operative position of the support stand, of the lower end region of the inner telescopic tube portion, while the spring element may be preferably a compression spring which is disposed in a mechanically prestressed condition in the interior of the first holding member, which for that purpose is of a generally cage-like configuration, between the first holding member and the actuating rod itself. That arrangement of the clamping cone members and the pressure elements which enclose the first holding element therebetween, also bearing snugly against same, gives a very compact construction for the fixing device without adversely affecting the operability of the fixing device and thus therefore also that of the support stand according to the invention. That arrangement of the clamping cone members, the pressure elements and the holding members makes it possible to use a compression spring as the spring element, the use of a compression spring achieving the further advantage that a compression spring still remains operable even if it should be broken whereas a tension spring would become inoperative in such a situation. The spring element also provides the further advantage that the support stand in accordance with the invention affords excellent sliding characteristics in respect of the two telescopically related tube portions of each support leg.

The first and second holding members may have resilient retaining or detent members while the lower end region of the inner one of the two telescopically related tube portions may have openings into which the retaining or detent members of the two holding members engage when the support leg is assembled. Holding members of that configuration are very easy to produce and can be very easily fitted in position in the support stand of this invention. Another advantage of holding members of that kind is that they can be very securely fixed to the end region of the inner tube portion so that, even after a support stand according to the invention has been in use over a very long period, damage to the individual parts of the fixing devices for the support legs is unlikely to occur.

It has been found advantageous, in accordance with a further feature of the invention, for the actuating rod, along a portion thereof, to have a male or external screwthread which, for the purposes of adjusting the prestressing of the spring element, can be screwed in a screwthreaded sleeve which is disposed in the inner one of the two telescopically related tube portions and which is prevented from rotating relative thereto. Such a configuration of the stand according to the invention makes it easily possible to adjust the mechanical prestressing of the spring element in such a way that the clamping cone members are axially displaced with a greater or lesser force relative to the axially stationary pressure elements so that, in the normal operating position of the support stand as referred to above, namely in which the fixing means is neither in a locked condition nor in a condition of permitting the telescopically related tube portions to move very easily relative to each other, the pressure elements press more or less firmly against the inside wall surface of the outer telescopic tube portion. That pressure force determines the frictional lock, that is to say, the frictional force between the pressure elements which are indirectly connected to the inner one of the telescopically related tube portions, and the outer tube portion, whereby adjustment of the prestressing of the resilient spring element permits the frictional lock between the outer and inner tube portions to be adjusted with a very high degree of accuracy. The frictional lock is intended to be of such a magnitude that it is relatively easily possible for the two telescopic tube portions to be displaced relative to each other by hand, without however the two tube portions being capable of moving of their own accord, as a result of the force of gravity.

In another preferred feature of the invention, the second pressure element may comprise a tubular portion which is adapted in respect of its outside dimensions to the inside dimensions of the inner one of the two tube portions and which is secured against axial movement relative thereto by means of the second holding member; disposed adjoining the tubular portion are resilient guide elements which co-operate with the second clamping cone member and which extend through openings in the inner tube portion and which face towards the inside wall surface of the outer tube portion. The above-indicated configuration of the second pressure element, with a tubular portion, whose outside dimensions are substantially adapted to the inside dimensions of the inner tube portion, permits the second pressure element to be fitted without any difficulty, the second pressure element being secured against substantial axial displacement within the inner tube portion, by means of the second holding member. Formed integrally on the tubular portion of the second pressure element are the resilient guide elements which co-operate with the second clamping cone member, while the openings in the inner telescopically related tube portion through which the pressure elements extend keep the axial displaceability of the second pressure element within admissible limits.

Further objects, features and advantages of an arrangement in accordance with the principles of the present invention will be apparent from the following description of a preferred embodiment which is given by way of example thereof.

DESCRIPTION OF THE PREFERRED EMBODIMENT

Figure 1:
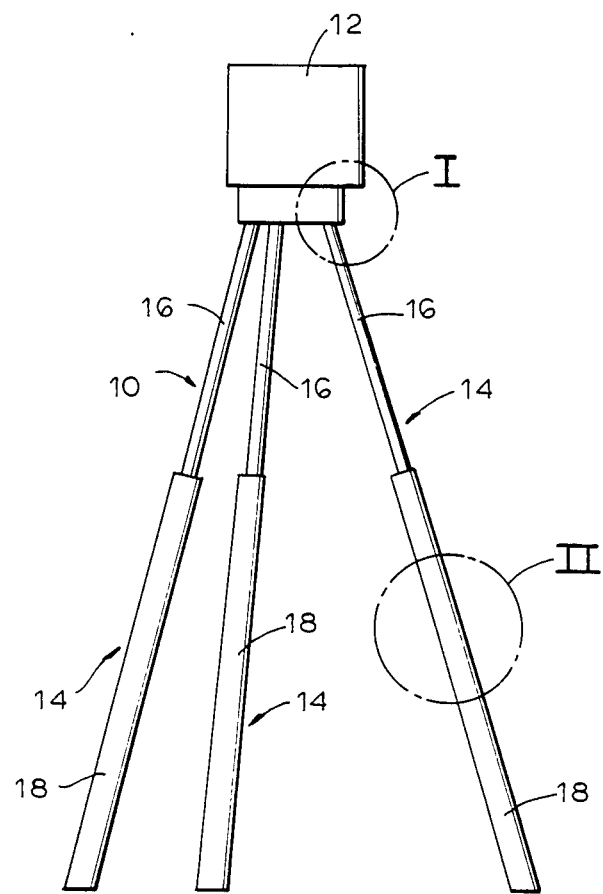
FIG. 1 is a side view of a stand.

Referring to FIG. 1, shown therein in diagrammatic form is a support stand 10 or tripod for supporting an item of equipment such as a photographic, film or video camera or another item or optical equipment which may be for example a telescope or the like. The support stand 10 comprises a support head portion 12 for mounting the item of equipment thereon, and, as illustrated, three support legs 14 which extend away downwardly from the support head portion 12. Each of the legs 14 comprises first and second tube portions 16 and 18 which are connected together in telescopic relationship in such a way that one tube portion, being referred to herein as the inner tube portion 16, can be displaced into and out of the other tube portion, referred to herein as the outer tube portion 18. The tube portions 16 and 18 of each leg can also be locked relative to each other, to fix the support stand 10 to provide support at a selected height. In the support stand 10 in accordance with the invention and as illustrated in the drawing, the inner tube portions 16 of the respective legs 4 are connected at their upper ends to the head portion 12 while the outer tube portions 18 are slidably carried on the inner tube portions 16 adjacent the lower ends thereof. In other words, the outer tube portions 18 form the lower portions of the legs and the inner tube portions 16 form the upper portions of the legs, being therefore the opposite arrangement to some previously known support stands in which the outer tube portion constitutes the upper part of the leg and the inner tube portion constitutes the lower part.

Figure 2:
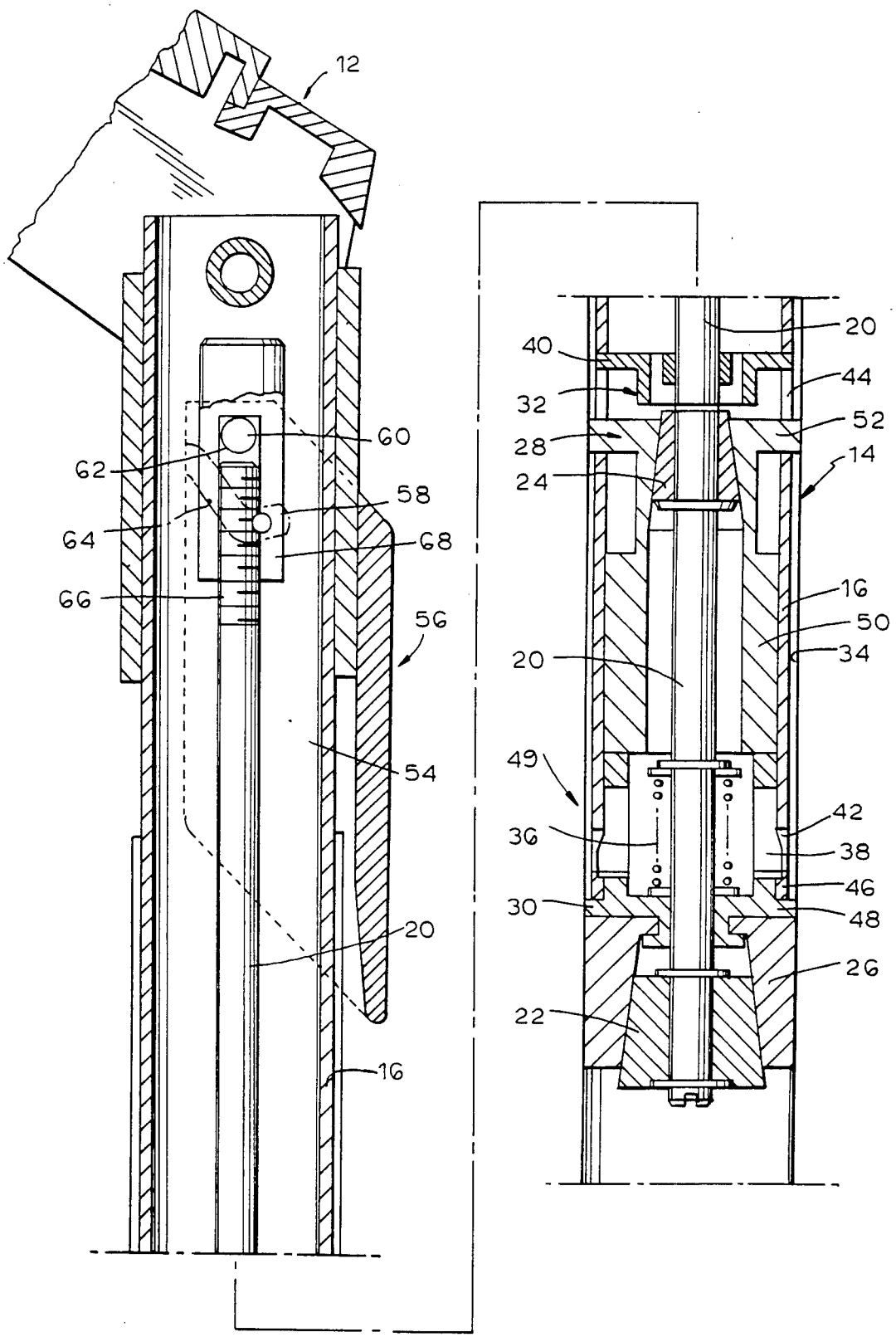
FIG. 2 is a view on an enlarged scale in longitudinal section of the details indicated at 'I' and 'II' in FIG. 1.

Reference will now additionally be made to FIG. 2 which shows a view on a lager scale and in longitudinal section of the detail indicated at 'II' in FIG. 1. FIG. 2 shows the front or lower end region of the inner telescopic tube portion 16, which, as will be recalled, forms the upper part of a respective leg, together with a part of the outer telescopic tube portion 18. The tube portions 16 and 18 can be locked relative to each other to fix the length of the respective leg, by means of a fixing device. As illustrated, the fixing device coprises an actuating means in the form of an actuating rod which extends through the inner tube portion 16 and which is axially displaceable therein. On its end region which is within the support leg 14, the actuating rod 20 carries two clamping cone or taper members 22 and 24 which, as can be clearly seen from FIG. 2, both taper in the same direction, thus decreasing in diameter upwardly in FIG. 2.

Disposed around each of the cone members 22 and 24 is a respective pressure element 26 and 28 respectively. Each pressure element 26, 28 is securely mounted on the loer end region of the inner tube portion 16 in such a way as to be at least substantially axially immovable thereon, by means of a respective holding member 30 and 32. Each pressure element 26 and 28 faces towards the inside wall surface 34 of the outer tube portion 18 and bears against or presses against the inside wall surface 34. A resilient spring element 36 is operatively disposed between the actuating rod 20 and the first holding member 30 for the pressure element 26, more specifically, one end of the spring element 36 which is shown in the form of a compression coil spring bearing against the holding member 30 and the other end of the spring element 36 bearing against an abutment fixed on the actuating rod 20, thereby to urge the actuating rod 20 upwardly in FIG. 1. By virtue of the actuating rod 20 being urged upwardly by the spring element 36 and by virtue of the tapering configuration of the two cone members 22 and 24, the pressure elements 26 and 28 which are operatively associated with the two cone members 22 and 24, in a normal operating condition of the fixing device as will be defined hereinafter, are pressed against the inside wall surface 34 of the outer tube portion 18 with a force such that a frictional lock which can be overcome by hand as provided between the two tube portions 16 and 18. It will be seen clearly from FIG. 2 that each of the expandable (i.e. resilient, slotted, or segmented) pressure elements 26 and 28 has a bore of a tapered configuration adapted to receive the corresponding cone member 22 and 24 so that displacement of the cone members upwardly in FIG. 2 causes expansion of the associated pressure elements 26 and 28. The normal operating condition of the fixing means, as referred to above, is a condition which differs both from the locked condition of the fixing device in which the telescopic tube portions are secured immovably relative to each other and also from the unlocked condition of the fixing device in which the telescopic tubes are displaceable relative to eac other very easily, for example under the effect of the force of gravity.

The frictional lock between the two telescopic tube portions 16 and 18, in the normal operating condition of the fixing device as just defined above, advantageously prevents the two tube portions from being unintentionally or accidentally displaced relative to each other in the axial direction, for example as a result of the force of gravity acting thereon.

The two clamping cone members 22 and 24 which are secured to the actuating rod 20 may be disposed at such a spacing from each other that the two pressure elements 26 and 28 respectively disposed around them may enclose between then the first holding member 30 which is secured to the lower or front end of the lower end region of the inner telescopic tube portion 16, as can be clearly seen from FIG. 2. As already mentioned above, the spring element 36 is preferably a compression spring which is disposed in the interior of the first holding member 30, which for that purpose is of a cage-like configuration, between the first holding member 30 and the actuating rod 20. In the normal operating condition of the fixing device, the spring element 36 is subjected to a mechanical prestressing. The mechanical prestressing of the spring element 36 causes the two clamping cone members 22 and 24 to be urged in the direction in which they decrease in diameter or corresponding transverse dimension, whereby the pressure elements 26 and 28 surrounding the cone members 22 and 24 are displaced limitly radially outwardly by virtue of the wedge effect as the two cone members 22 and 24 more more deeply into the associated pressure elements 26 and 28. The wedge effect causing expansion of the pressure elements 26 and 28 thus produces a frictional lock as between the pressure elements 26 and 28 and the inside wall surface 34 of the outer telescopic tube portion 18.

Referring still to FIG. 2, the first holding member 30 and the second holding member 32 have resilient retaining or detent members or portions as indicated respectively at 38 and 40. Likewise the lower end region of the inner telescopically related tube portion 16 has sets or arrays of openings as indicated at 42 and 44 respectively, into which the detent members 38 and 40 of the two holding members 30 and 32 engage, thereby to hold the holding members in the tube portion 16.

Along a part of the actuating rod 20 which is not visible in FIG. 2 the actuating rod has an external or male screwthread which, for the purposes of setting a given degree of prestressing of the spring element 36, can be screwed in a screwthreaded sleeve which is disposed non-rotatably in the inner tube portion 16. Rotation of the actuating rod 20 in the screwthreaded sleeve causes the two clamping cone members 22 and 24 to be displaced in the axial direction so that the pressure elements 26 and 28 respectively disposed around the core members 22 and 24 are pressed more or less against the inside wall surface 34 of the outer tube portion 18, whereby the frictional lock between the inner tube portion 16 and the outer tube portion 18, by way of the above-described fixing arrangement, can be increased or decreased in strength. That will therefore vary the amount of manual force required to displace the outer tube portion 18 on the inner tube portion 16, when the fixing device is in the above-defined normal operating condition.

Referring still to FIG. 2, it will be seen therefrom that the second pressure element 28 comprises a tubular portion 50 which is at least substantially adapted in respect of its external dimensions to the internal dimensions of the inner tube portion 16 and which is secured substantially axially immovably therein by means of the second holding member 32. Disposed adjoining the tubular portion 50 are resilient guide elements 52 which co-operate with the second cone member 24 and which extend through the openings 44 in the inner tube portion 16 and face towards the inside wall surface 34 of the outer tube portion 18.

Referring now to the upper portion of FIG. 2 which shows a view on a larger scale and in longitudinal section of the detail indicated at 'I' in FIG. 1, the fixing device for the illustrated leg 14 comprises an actuating member 56 which is mounted pivotally on leg 14 in the following manner: The actuating rod 20 which extends within the leg 14 is operatively connected to the actuating member 56 and the clamping arrangement indicated generally at 49. The actuating member 56 is carried on the inner tube portion 16 in the vicinity of the support head portion 12 of which only a part is shown in FIG. 2.

The actuating member 56 is pivotable between first, second, and third positions, the first position corresponding to a locking position in which the inner and outer tube portions 16 and 18 of the respective leg 14 are prevented from axial movement relative to each other, while the third position is unlocked or released position in which the two tube portions 16 and 18 can move easily relative to each other, for example, of their own accord as a result of the force of gravity acting thereon. The second position is what is referred herein as the normal operating position, in which condition the actuating member 56 is neither in the locked position or in the unlocked position, but is in a position in which there is a frictional connection, which can be overcome by hand, between the two tube portions 16 and 18 of the associated leg 14, thereby permitting the length of the leg to be accurately adjusted by user. The actuating member 56 is shown in FIG. 2 in the locking position.

In the normal operating position of the actuating member 56, the clamping arrangement 49 provides a sliding frictional connection between the inner tube portion 16 and outer tube portion 18, such that, as mentioned above, the two tube portions 16 and 18 can be displaced relative to each other in the longitudinal direction of the leg 14. In that way, the overall length of the leg 14 can adjusted with a very high degree of accuracy and in a controlled fashion.

In the locking position of the actuating member 56, the clamping arrangement 49 produces a mechanically fixed gripping frictional connection between the inner tube portion 16 and the outer tube portion 18, in such a way that the two tube portions 16 and 18 cannot be displaced relative to each other by hand. Thus, when the actuating member 56 is in the locking position, the overall length of a leg 14 is invariable.

In the released or unlocked position of the actuating member 56, which can be very easily attained by simple pivoting of the actuating member by hand, the fixed connection between the inner tube portion 16 and the outer portion 18 is released so that the outer tube portion 18 can be moved easily, for example, by virtue of the force of gravity acting thereon, in relation to the inner tube portion 16.

The actuating member 56 is mounted on the inner tube portion 16 pivotally about a mounting pin 60 which extends through two mutually aligned openings 62 in the inner tube portion 16 and which is operatively connected to the actuating rod 20 within the leg 14. As indicated by broken lines in FIG. 2, the actuating member 56 has two guide means or slide tracks 64 which are guided on lugs or projections such as pins 58 which are secured to the outside surface of the inner tube portion 16 and which project away from the latter and mutually opposite directions.

When the actuating member 56 is pivoted from a normal operating position in one direction, the distance between the mounting pin 60 and the projections 58 is reduced. This causes the actuating rod 20 to be moved downward, by virtue of the actuating rod 20 being operatively connected to the pin 60. Because the actuating rod 20 moves downward, the wedge effect which is provided by the operation between cone members 22 and 24 and the pressure elements 26 and 28, respectively disposed therearound is eliminated whereby tthe pressure elements 26 and 28 are no longer pressed against the inside wall surface of the outer tube portion 18.

When the actuating member 56 is pivoted from the normal operating position in the opposite direction to the direction referred to above, that is to say, toward the locking position of the actuating member 56, the distance between the mounting pin 60 and the projection 58 is increased. This causes the actuating 20 to be moved upwardly toward the head portion 12 so that the cone members urge the pressure elements radially outward and into strong and firm contact with the inside wall surface of the outer tube portion 18. Accordingly, the pivotal movement of the actuating member 56 into the locking position gives a mechanically fixed lock as between the inner tube portion 16 and the outer portion 18, by virtue of the clamping arrangements 49 being carried by the inner tube portion 16 and being operable to bear against the inside wall surface of the outer tube portion 18.

The actuating member 56 has two side plate members or portions 54 which embrace the inner tube portion 16, thus extending on respective sides thereof. The mounting pin 60 is mounted in the two side plate members 54 of the actuating member 56 and the two mutually aligned openings 62 in the inner tube portion 16 are in the form of slots which are elongated at least substantially in the axial direction of the tube portion 16. Thus, when the actuating member 56 is pivoted, the projections 58 are displaced in the guide means 64 with which they respectively cooperate and the pin 60 can perform a limited movement in the axial or longitudinal direction of the leg 14, and thus in the direction of the actuating rod 20. The two guide means 64 are in the form of slide tracks, such as grooves, in the respective insides surfaces, which face toward the inner tube portion 16 of the two side plate members 54. The two slide tracks are of aligned configuration and arrangement and the two projections 58 secured to the inner tube portion 16 are aligned with each other. The aligned configuration and arrangement of the two slide tracks and the mutually aligned projections ensures that the actuating member 56 is convenient to operate.

It can be seen in FIG. 2 that the actuating rod 20 has a male screw threaded portion 66 which mates with a female screw threaded sleeve 68. The sleeve 68 is prevented from rotating with respect to the inner tube 16 by means of pin 60. Rotating the connecting rod 20 in one direction of rotation or the other makes it possible to adjust the prestressing force which provides for the clamping arrangement 49 to take up the normal operating condition in which it provides resilient to relative movement of the tube portions 16 and 18 with respect to each other, which, however, can be overcome by manual force, as well as permitting adjustment of the locking force with which the cone members 22 and 24 are caused to urge the pressure elements 26 and 28 radially outwardly to lock against the outer tube portion 18, thereby firmly to secure the two tube portions 16 and 18 relatively to each other.

With the above-described arrangement in accordance with the invention, the fixing device, in its normal operating condition, prevents the inner and outer tube portions 16 and 18 of each leg from sliding very freely relative to each other, which can result in the length of the respective leg being unintentionally increased, for example when the operator of the item of equipment mounted on the support stand 10 lifts the support stand off the ground, so that the force of gravity could pull the outer or lower tube portions 18 downwardly when that is not desired. In addition, the illustrated arrangement of the actuating rod 20 afffords the further advantage that the actuating member which is connected thereto, for actuation thereof, may be disposed in the vicinity of the support head portion 12 so that each leg can be fixed at its set length by manipulation of the actuating member in the vicinity of the support head portion, hence substantially obviating the need to bend lower down, as would be the case if the actuating member were disposed at the transitional region between the inner and outer tube portions 16 and 18.

It will be appreciated that the foregoing construction was described solely by way of example of the principles of the present invention and that modifications and alterations may be made therein without thereby departing from the spirit and scope of the present invention.

I claim:

1. A suppport stand for an item of equipment, comprising: a hand portion; support legs which are connected to the head portion and which extend downwardly therefrom and each of which comprise inner and outer tube portions displaceable in telescope relationship with each other; and a respective fixing means adapted to fix the tube portions of each leg relative to each other, said fixing means comprising an actuating rod displaceable in the axial direction of the respective leg and actuable from outside the tube portions, first and second clamping cone members which taper in the same direction and which are disposed on the actuating rod in the vicinity of the lower end of the inner said tube portion, a respective expandable pressure element around each said cone member and co-operative therewith, holding members holding said pressure elements axially immovably on said lower end of the inner tube portion whereby said pressure elements are adapted top bear against the inside wall surface of the outer one of said tube portions under the action of the associated cone members, and a resilient means operable to urge said actuating rod in the direction in which said cone members taper whereby in a normal operating condition of the fixing means towards which said cone members are urged said cone members press said pressure elements against the inside wall surface of the outer tube portion, with such a force as to provide a frictional connection which can be overcome by hand between the two tube portions.

2. A stand as set forth in claim 1 which said resilient means is operatively disposed between a said holding member and an abutment means on said actuating rod.

3. A stand as set forth in claim 1 wherein said cone members fixed on the actuating rod are disposed at a spacing from each other such that said pressure elements operatively associated with the respective cone members enclose between them a first said holding member of hollow construction secured to the lower end portion of said inner tube portion, and wherein said resilient means is a compression spring disposed in a mechanically prestressed condition in the interior of said first holding member between said first holding member and said actuating rod.

4. A stand as set forth in claim 1 wherein said holding members include resilient retaining means and said lower end portion of said inner tube portion has openings, said retaining means engaging into said openings when the support leg is assembled.

5. A stand as set forth in claim 1 including a sleeve having a female screw thread non-rotatably disposed in said inner tube portion, wherein said actuating rod on a portion thereof has a male screw thread which is adapted to be screwed in said screw threaded sleeve for the purposes of adjusting the prestressing of said resilient means.

6. A stand as set forth in claim 1 wherein a said pressure element comprises a tubular portion which is adapted in respect of its outside dimensions to the inside dimensions of said inner tube portion, wherein disposed on said pressure element adjoining said tubular portion are resilient guide means co-operable with the associated cone member, and wherein said inner tube portion has openings through which said resilient guide means extend towards the internal surface of said outer tube portion.

7. A support tripod for an item of equipment comprising: a mounting means for mounting said item of equipment thereon; three support legs each having a first end adapted to rest on a support surface in relation to which the said item of equipment is to be disposed at a preselectable height, and a second end connected to said mounting means, each leg comprising first and second tube portions disposed in telescopic relationship with each other, with the outer one of the tube portions constituting the lower part of the respective leg and the inner one of the tube portions constituting the upper part of the respective leg and connected to said mounting means; and a fixing means associated with each said leg for locking said tube portions thereof relative to each other in a selectable position thereby to set the length of the leg at a selectable value, the fixing means comprising: an actuating rod extending within each respective said leg and actuable from outside same and having a first end disposed at least substantially adjacent the second end of the respective said leg and a second end which extends within the respective leg to the lower end of the inner tube portion; carried on said actuating rod adjacent said second end thereof at a spacing from each other are first and second taper members both tapering in the same axial direction in respect of the respective leg; disposed around each said taper member and co-operable therewith is a respective expandable pressure element having an outside surface which is adapted to bear against the inside surface of the outer tube portion surrounding same; holding members holding said respective pressure elements substantially axially immovable in relation to the lower end of the inner tube portion; and a resilient means dapted to act on said actuating rod thereby to urge said fixing means into an operating condition in which the tapering configuration of said taper members in relation to the respectively associated pressure elements causes said pressure elements to be urged outwardly into frictional contact with the adjacent inside surface of the outer tube portion under a force such as to provide, between the first and second tube portions, a frictional lock which can be overcome by hand, thereby to prevent inopportune movement of said first and second tube portions relative to each other.

* * * * *